(12) United States Patent
Spitzenberger et al.

(10) Patent No.: US 9,941,617 B2
(45) Date of Patent: Apr. 10, 2018

(54) DAMPING ELEMENT FOR PROVIDING AXIAL DAMPING IN A PLUG-IN CONNECTOR

(71) Applicant: ODU GmbH & Co. KG, Mühldorf (DE)

(72) Inventors: Dieter Spitzenberger, Kraiburg (DE); Georg Pfister, Mühldorf (DE); Alexander Geringer, Mühldorf (DE)

(73) Assignee: ODU GmbH & Co. KG, Mühldorf (DE)

( * ) Notice: Subject to any disclaimer, the term of this patent is extended or adjusted under 35 U.S.C. 154(b) by 0 days.

(21) Appl. No.: 15/269,984

(22) Filed: Sep. 20, 2016

(65) Prior Publication Data

US 2017/0149160 A1 May 25, 2017

(30) Foreign Application Priority Data

Nov. 25, 2015 (EP) .................................... 15196349

(51) Int. Cl.
*H01R 13/424* (2006.01)
*H01R 4/48* (2006.01)
(Continued)

(52) U.S. Cl.
CPC ........... *H01R 13/424* (2013.01); *F16F 1/376* (2013.01); *F16F 1/445* (2013.01); *H01R 4/48* (2013.01);
(Continued)

(58) Field of Classification Search
CPC ... H01R 13/2414; H01R 13/44; H01R 13/187
(Continued)

(56) References Cited

U.S. PATENT DOCUMENTS 3,394,341 A * 7/1968 Venn .................... H01R 13/193
439/593
3,474,386 A * 10/1969 Link ..................... H01R 13/53
439/181
(Continued)

FOREIGN PATENT DOCUMENTS

DE 4320491 A1 12/1994
DE 9418669 U1 3/1996
(Continued)

OTHER PUBLICATIONS

Search Report of counterpart European Patent Application No. 15196349.3 dated May 19, 2016.
(Continued)

*Primary Examiner* — Ross Gushi

(57) ABSTRACT

A damping element for a plug-in connector is described, the plug-in connector comprising a socket and a connector pin pluggable into the socket. The damping element is configured to be disposed inside of the socket and comprises a first bearing face adapted for lying flat against the bottom of the socket and a second bearing face adapted for lying flat against the front face of the connector pin. Either a first shaft is attached at or integrally molded with the first bearing face or a second shaft is attached at or integrally molded with the second bearing face. The damping element is adapted for providing a damping effective in the axial direction between the connector pin and the socket.

17 Claims, 3 Drawing Sheets

(51) Int. Cl.
*H01R 43/26* (2006.01)
*H01R 13/04* (2006.01)
*H01R 13/10* (2006.01)
*H01R 13/533* (2006.01)
*F16F 1/376* (2006.01)
*F16F 1/44* (2006.01)
*H01R 13/52* (2006.01)
*H01R 101/00* (2006.01)

(52) U.S. Cl.
CPC .............. *H01R 13/04* (2013.01); *H01R 13/10* (2013.01); *H01R 13/533* (2013.01); *H01R 43/26* (2013.01); *H01R 13/5219* (2013.01); *H01R 2101/00* (2013.01)

(58) Field of Classification Search
USPC .............. 439/382–385, 86, 91, 88, 181, 934
See application file for complete search history.

(56) References Cited

U.S. PATENT DOCUMENTS

| | | | |
|---|---|---|---|
| 3,871,737 A | 3/1975 | Dorrell et al. | |
| 4,262,982 A * | 4/1981 | Kenny | A61N 1/3752 439/281 |
| 5,562,477 A | 10/1996 | Moore et al. | |
| 5,611,717 A | 3/1997 | Joly | |
| 6,280,207 B1 * | 8/2001 | Sakata | H01R 13/2414 439/591 |
| 7,355,122 B2 * | 4/2008 | Moore | E21B 33/0385 174/84 R |
| 7,384,210 B2 | 6/2008 | Sura et al. | |
| 7,785,145 B2 | 8/2010 | Menez | |
| 7,878,866 B1 * | 2/2011 | Kwasny | B60L 11/1818 439/474 |
| 9,331,416 B2 * | 5/2016 | Natter | H01R 13/44 |
| 2012/0258621 A1 | 10/2012 | Provost et al. | |

FOREIGN PATENT DOCUMENTS

| | | |
|---|---|---|
| DE | 20003224 U1 | 6/2001 |
| DE | 10339261 A1 | 3/2005 |
| DE | 202014006815 U1 | 9/2014 |
| DE | 202014105366 U1 | 11/2014 |
| DE | 202015001331 U1 | 4/2015 |
| JP | 2001108106 A | 4/2001 |
| JP | 2008276991 A | 11/2008 |
| JP | 2008282577 A | 11/2008 |

OTHER PUBLICATIONS

Examination Report of counterpart European Patent Application No. 15196349.3 dated Jul. 6, 2017.

* cited by examiner

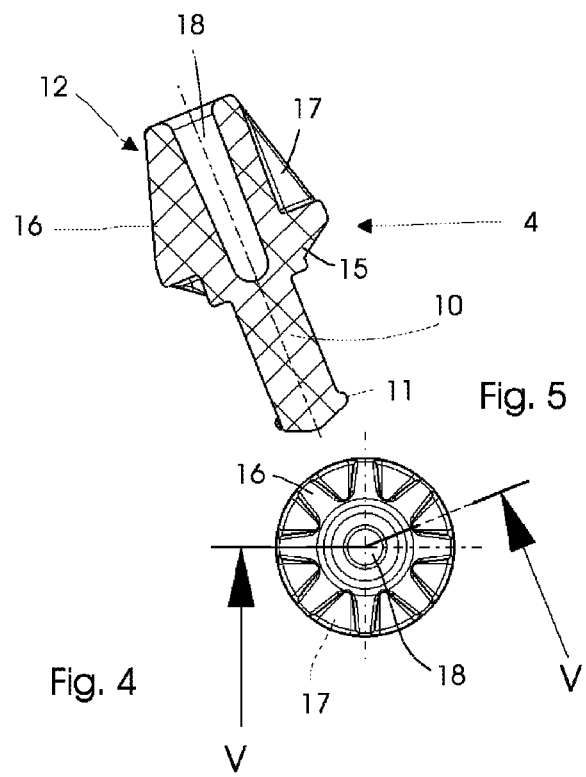
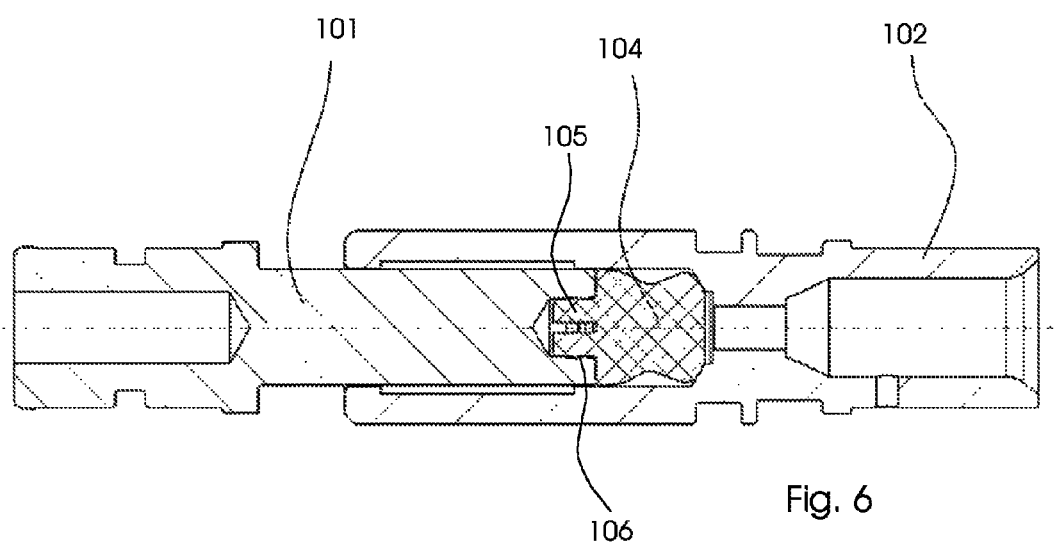

DAMPING ELEMENT FOR PROVIDING AXIAL DAMPING IN A PLUG-IN CONNECTOR

CROSS-REFERENCE TO RELATED APPLICATIONS

The present application claims the benefit of European Patent Application No. 15 196 349.3 filed on Nov. 25, 2015, the entire content of which is hereby incorporated by reference.

FIELD OF THE INVENTION

The invention relates to a damping element for a plug-in connector comprising a socket and a connector pin pluggable into the socket. The invention also relates to a plug-in connector comprising a socket, a connector pin and a damping element, and to a method for forming a plug-in connection between a socket, a connector pin and a damping element.

BACKGROUND OF THE INVENTION

Plug-in connectors are increasingly used in applications where the plug-in connector, which comprises a socket and a connector pin, is exposed to strong vibrations. Because of the relative movement of the connector pin relative to the socket, the contact area between socket and connector pin may be subjected to abrasion.

In U.S. Pat. No. 5,562,477 A, a high vibration electrical connector is described. Included in the connector is a receptacle that is preferably integral with a surface of an electrical component. The receptacle includes a securing wedge and an electrical pin. Also included in the electrical connector is a vibration dampening pad and a plug. The plug includes a fastening bar and a securing notch that engages with the securing wedge when said plug is inserted in said receptacle. The plug also includes a plug cap to help seal the plug from external contaminants.

German utility model DE 94 18 669 U1 describes an electrical plug-in connector, in which two contact tongues can be brought into contact with a knife-shaped counter plug. Thereby the tip of the contact tongues is overlapped with an elastomer sealing element that is mounted at the contact tongues at the altitude of the contact point. The tension of the sealing element that acts in addition to the spring force of the contact tongues causes an increase of the contact pressure between the contact element and the knife-shaped counter plug, so that contacting is improved.

German utility model DE 200 03 224 U1 describes an electrical plug-in connector with a rotatably mounted union nut. A securing facility is associated with the union nut and the contact carrier. The securing facility comprises a radial recess at the circumference of the contact carrier and a corresponding recess at the union nut. Between these radial recesses, a gap is formed, with an elastic ring being placed in the gap.

German patent application DE 43 20 491 A1 describes an electric plug-in connector with a plug and an associated mating plug. The plug-in connection is to be carried out such that an impacting vibrational load does not exert any disturbances onto the contacts of the plug-in connection. For this purpose, the plug comprises a sealing compound in the form of a circumferentially closed radial seal fitted external of the contact carrier.

U.S. Pat. No. 7,785,145 B2 describes an electrical connector for attenuating vibrations, in particular for the injector of a motor vehicle engine. The connector includes a locking device that prevents the disconnection of the connector and the counterpart. Said connector includes an elastic vibration attenuating member arranged in such a way that it produces the mutual elastic rest force of the stop surfaces when the connector and the counterpart thereof are coupled. The invention can be used for connecting the injector of a motor vehicle internal combustion engine.

U.S. Pat. No. 5,611,717 A describes a miniature anti-fretting receptacle terminal. The terminal comprises an inner contact and an outer body. The inner contact is U-shaped and has a spring section positioned between a connection section and a contact section for resilient longitudinal movement of the contact section with respect to the connection section for preventing fretting corrosion. The spring section is comprised within side walls and a bottom wall whereby this U-shape is easy to stamp and form thereby increasing the ease of manufacture.

Japanese patent application JP 2008 276 991 A describes an electrical connector capable of securing favourable electrical connection by preventing Fretting corrosion from being generated in an electrical contact part even at vibration. In this connector, a plug-type connector is engaged with a socket type connector, the abutting part of a conical pedestal of a plug and a housing of a socket are energized with each other by an elastic member.

German utility model DE 20 2014 105 366 U1 describes a plug-in connector for establishing an electric connection with a counterpart that comprises a housing in which contacts are arranged that are connectable with a cable that is led out of the housing, with a rotationally mounted securing sleeve for realising a screw connection for securing the plug-in connection with the counterpart, wherein at least towards the end of the securing screwing movement, an axial section of the housing and an axial section of the securing sleeve form a positive-locking fit that ensures a vibration protection of the plug-in connection and with an elastic seal that protects the plug-in connector against foreign substances.

German patent application DE 103 39 261 A1 describes a cable connector system with a contact body that comprises at a cable connector end first means for establishing a detachable electrical and mechanical connection with the end of a cable, wherein the first means comprise a substantially rotationally symmetric central clamping element and a sleeve that concentrically encompasses the clamping element. The clamp sleeve comprises an inner substantially rotationally symmetric clamping contour such that when screwing together the clamp sleeve and the clamping element, a stranded wire of the cable to be connected that is introduced into the interspace between the clamping element and the clamping contour is clamped.

German utility model DE 20 2015 001 331 U1 describes a plug-in connector, in particular a high current plug-in connector, with an inner conductor for carrying a current, an outer conductor and an insulating part that separates the inner conductor and the outer conductor. An elastic compressible damping element is provided at the plug-in connector in a way that it is elastically compressible when the complementary counter connector is inserted into the connector and thereby reduces a mobility of the insulating part relative to the inner conductor and/or relative to the outer conductor.

However, in these solutions, particularly in situations where the plug-in connector is exposed to vibrations, there still is a strong abrasion which in turn gives rise to an undesirably large transition resistance.

OBJECT OF THE INVENTION

Thus, the object of the invention is to provide a damping element and a plug-in connector at a low price that can be exposed to high loads, in particular strong vibrations, over extended periods.

SUMMARY OF THE INVENTION

According to the invention, a damping element for a plug-in connector is provided, the plug-in connector comprising a socket and a connector pin pluggable into the socket. The damping element is configured to be disposed inside of the socket and comprises a first bearing face adapted for lying flat against the bottom of the socket and a second bearing face adapted for lying flat against the front face of the connector pin. Either a first shaft is attached at or integrally moulded with the first bearing face. Preferably, the first shaft is adapted for attaching the damping element at the bottom of the socket. Or a second shaft is attached at or integrally moulded with the second bearing face. Preferably, the second shaft is adapted for attaching the damping element to the front face of the connector pin. The damping element is adapted for providing a damping effective in the axial direction between the connector pin and the socket.

By using the damping element according to the present invention in a plug-in connector, it can advantageously be achieved that a relative movement between socket and connector pin in the axial direction is effectively dampened. The consequence is that the axial movement between the connector pin on the one hand and the socket on the other hand is reduced, whereby abrasion and hence wear at the connector pin and at the socket are reduced as well. Thus, even if the plug-in connector is exposed to strong vibrations, a low ohmic transition resistance between the connector pin and the socket can be ensured over extended periods. In this way, a reliable electrical contact between socket and connector pin can be ensured even under adverse environmental conditions over long periods.

The damping element according to the invention either comprises a first shaft at the first bearing face for attaching the damping element at the bottom of the socket or a second shaft at the second bearing face for attaching the damping element at the front face of the connector pin. Thus the damping element can either be fixed at the bottom of the socket or at the front face of the connector pin. When the connector pin is plugged in, the damping element is thus located in the interior of the socket between the front face of the plugged-in connector pin and the bottom of the socket. Thus, the damping element is exactly located where the axial damping between connector pin and socket is required. A further advantage is that the damping element can be designed comparatively small, so that the material expenditure for the damping element is low. By disposing the damping element inside the socket, it is further accomplished in contrast to previous solutions of the prior art that the damping element is protected by the socket itself from aggressive environmental conditions. In this way, it is prevented that the comparatively sensitive polymeric material can get into contact with aggressive and corrosive chemicals that may attack and affect the material of the damping element in any conceivable way, for example lead to an embrittlement of the material.

According to the invention, a plug-in connector comprises a socket for accepting a connector pin, a connector pin configured for being plugged into the socket and being unplugged from the socket again, and a damping element arranged such that if the connector pin is plugged in, the damping element is disposed inside the socket between a front face of the connector pin and a bottom of the socket. The damping element is configured to provide a damping effective in the axial direction between the connector pin and the socket.

By using a damping element of this kind, the relative movement between socket and connector pin is effectively dampened in the axial direction. It has been found that in particular the axial relative movement between socket and connector pin is crucial for wear and abrasion of the contact areas of socket and connector pin that are in contact with each other. In this respect, for reducing aberration it is particularly important to provide an effective damping between connector pin and socket in the axial direction. In environments that are characterised by strong mechanical vibrations, abrasion at the contact areas can thus be kept small over longer periods, so that a good electrical contact with low ohmic transition resistance can be ensured over longer periods.

According to the invention, a method for forming a plug-in connection between a socket for accepting a connector pin and a connector pin that is configured to be plugged into the socket and unplugged from the socket again is provided. The method comprises inserting the connector pin into the socket, and pressing together a damping element by the connector pin, wherein the damping element is disposed between a front face of the connector pin and a bottom of the socket, and wherein the compressed damping element provides a damping effective in an axial direction between the connector pin and the socket.

The relative movement between socket and connector pin in the axial direction is effectively dampened by the damping element arranged between the plug-in connector pin and the bottom of the socket. Thereby, the abrasion caused by the relative movement between connector pin and socket can be significantly reduced. By using the damping element, a good electrical contact between the plugged-in connector pin and the socket can be accomplished over longer periods even under severe mechanical vibrations.

PREFERRED EMBODIMENTS OF THE INVENTION

Preferred features of the invention which may be applied alone or in combination are discussed below and in the dependent claims.

A preferred damping element may e.g. consist of electrically insulating material. In a damping element made of electrically insulating material, there is no current flow, and accordingly, no material degradation caused by current flow can occur. In case the damping element is configured for being attached at the front face of the connector pin, it can act as an electrically insulating protection cap to provide a touch protection.

Preferably, the damping element consists of a polymer, further preferably of an elastomer, and further preferably of a silicone rubber. Materials of this kind possess the dampening properties required for forming a damping element.

Damping is to be understood as an attenuating process in connection with oscillation, vibration and motion processes that leads to a decay of the motion as a result of dissipative processes. An example of a damping process is the oil-filled shock absorber of a vehicle that takes up and dampens shocks that are due to road bumps, whereby kinetic energy is converted into heat. Damping is therefore a dissipative process, whereby kinetic energy is converted to heat. In contrast to damping, in case of elastic behaviour the kinetic energy is stored in the elastic body and then released, like e.g in a spring. In case of elastic behaviour, the kinetic energy is thus preserved; it is not converted into heat. In this respect, the elastic behaviour is relevant for maintaining an oscillation, whereas the dissipative damping behaviour is responsible for the decay of the oscillation.

Preferably, the damping element is configured for being pressed together between the front face of the connector pin and the bottom of the socket when the connector pin is inserted into the socket. Due to the compression of the damping element, the bearing face of the damping element facing the connector pin lies flat against the front face of the connector pin, and the bearing face of the damping element facing the bottom of the socket lies flat against the bottom of the socket. Hence, the damping element is in contact with the contact pin as well as with the socket. This results in a succession of connector pin, damping element and socket arranged one behind the other, which is capable of effectively absorbing vibrations and relative movements between the connector pin and the socket in the axial direction.

Preferably, the material of the damping element possesses dampening properties as well as elastic properties. Because of the damping properties, it is accomplished that the vibrations decay and their amplitude decreases, because the kinetic energy is dissipatively converted to heat. In contrast, the elastic properties of the damping element are responsible that the damping element reassumes its initial shape after deformation and can thus follow the movements of the connector pin.

Preferably, the dampening properties as well as the elastic properties of the materials used are configurable via the material composition within certain ranges. For example, by suitably choosing the composition of polymeric material used, a damping element having the desired properties can be produced.

Preferably, the material of the damping element has a Shore hardness in the range from 20 to 60. The Shore hardness is a material parameter for elastomers and plastic materials. For determining the Shore hardness, it is detected how deep a spring-loaded stylus penetrates into a material to be tested, wherein the penetration depth into the material to be tested is a measure for the Shore hardness. The Shore hardness is measured on a scale from 0 Shore (2.5 mm penetration depth) to 100 Shore (0 mm penetration depth), wherein a large number corresponds to a large hardness.

It is preferred that via the Shore hardness of the damping element, deformation force and dampening properties of the damping element can be influenced. Preferably, the material composition of the damping element is chosen such that the hardness of the damping element is adjusted to the frequencies of occurring vibrations.

Preferably, the side of the element facing the front face of the connector pin has a truncated cone shape. With such a design of the damping element, it is accomplished that initially, a small force is counteracting the connector pin, which gets stronger the farther the connector pin is pushed into the direction of the socket.

It is preferred that the damping element comprises a plurality of fins extending radially outward, wherein deformation force and dampening properties of the damping element are adjustable by a suitable choice of number and design of the fins. For example, in case the damping element only possesses a small number of comparatively thin fins, a comparatively soft damping element is obtained. In contrast, in case the damping element possesses a plurality of comparatively strong fins, a comparatively hard damping element is obtained. By varying the geometry of the damping element, it is therefore possible to adjust the hardness and the dampening properties of the damping element to the respective circumstances even without changing the material composition.

Preferably, deformation force and dampening properties of damping elements are adjustable via the distance between the first bearing face and the second bearing face of the damping element. The larger the distance between the bearing face at the connector pin and the bearing face at the bottom of the socket, the softer the dampening properties of the damping element will be.

Preferably, the damping element comprises a core hole extending in the axial direction, wherein the deformation force and the dampening properties of the damping element are influenceable via the diameter of the core hole and the resulting wall thickness of the damping element. For example, if the core hole has a large diameter, this will result in a relatively small wall thickness of the damping element, which will therefore be quite soft and easily deformable. In contrast, if the diameter of the core hole is chosen comparatively small, the wall will be quite thick and accordingly, a hard damping element is obtained.

Preferably, the damping element is configured for being attached at the bottom of the socket. By attaching the damping element at the bottom of the socket, the damping element always remains inside the socket, even if the connector pin is pulled out. Thus, it is made sure that there is always a damping element between the connector pin and the socket for dampening the relative movement. The attachment at the bottom of the socket has the advantage that the damping element is effectively protected by the surrounding sidewalls of the socket.

It is preferred that the first shaft is attached at or integrally moulded with the first bearing face for attaching the damping element at the bottom of the socket, wherein the first shaft is configured to be inserted into a corresponding opening at the bottom of the socket for fixing the damping element at the bottom of the socket. Hence, the first shaft is provided for fixing the damping element at a defined position at the bottom of the socket. Because of the first shaft attached at or integrally moulded with the damping element, a characteristic mushroom-shaped design of the damping element is obtained, wherein the cap of the mushroom serves for absorbing vibrations and wherein the shaft of the mushroom serves for anchoring the damping element at the bottom of the socket.

Preferably, the first shaft comprises a plurality of knobs at its end facing the socket, said knobs fixing the damping element inside the socket when the first shaft is inserted into the corresponding opening at the bottom of the socket. After the first shaft is inserted into the opening, the snap-in knobs expand behind the opening and prevent that the first shaft slips out of the opening. Thus, the damping element is fixed at the bottom of the socket.

Alternatively, the damping element is preferably configured for being attached at the front face of the connector pin. Also in the variant, after the connector pin has been plugged in, the damping element is located between the front face of the connector pin and the bottom of the socket and can thus dampen an axial relative movement between connector pin and socket. Because of the attachment at the front face of the connector pin, the damping element is easily accessible and can accordingly by checked in an easy way and replaced if required. Thus, a damping element that is abraded or embrittled can e.g. be replaced in a simple way.

Preferably, a second shaft is attached at or integrally moulded with the second bearing face for attaching the damping element at the front face of the connector pin, wherein the second shaft is configured to be inserted into a corresponding opening at the front face of the connector pin for fixing the damping element at the front face of the connector pin. Hence, the connection between the damping element and the front face of the connector pin is again established via a shaft attached at or integrally moulded with the damping element that is inserted into a corresponding opening.

It is preferred that the second shaft comprises a plurality of knobs at its end facing the connector pin, said knobs fixing the damping element at the front face of the connector pin when the second shaft is inserted into the corresponding opening at the front face of the connector pin.

Preferably, deformation force and dampening properties of the damping element are adjustable through the interaction of the Shore hardness and the geometrical design of the damping element. The dampening properties as well as the elastic properties of the damping element can be adjusted in a wide range via the material composition on the one hand, but also via the geometric design on the other hand.

A preferred plug-in connector is configured to establish an electric connection between the connector pin and the socket when the connector pin is inserted into the socket. Preferably, the electric connection is established via the sidewalls of the socket.

In a preferred plug-in connector, the damping element is configured such that if the connector pin is plugged in, the damping element is pressed together inside the socket between the front face of the connector pin and the bottom of the socket. By compressing the damping element, the bearing face of the damping element facing the connector pin lies flat against the front face of the connector pin, and the bearing face of the damping element facing the bottom of the socket lies flat against the bottom of the socket. Thus, the damping element is in contact with the connector pin as well as with the socket. This results in a succession of connector pin, damping element and socket arranged one behind the other, which is capable of effectively absorbing vibrations and relative movements between connector pin and socket that occur in the axial direction.

It is preferred that the material of the damping element possesses dampening properties as well as elastic properties. Due to the dampening properties, the damping element is capable of absorbing vibrations in part or completely. In contrast, the elastic properties of the damping element make sure that the damping element returns to its initial shape after the compression. Thus, it is achieved that the bearing face of the damping element facing the connector pin constantly lies flat against the front face of the connector pin and follows the movements of the connector pin.

It is preferred that the damping element is supported by the bottom of the socket. Furthermore, it is preferred that inside the socket, the front face of the plugged-in connector pin is resiliently supported by the damping element. Because of this resilient support by the damping element, the connector pin and the socket are combined to a vibration-absorbing entity.

Preferably, the damping element is configured such that if the connector pin is plugged in, the damping element exerts an elastic force on the connector pin in an axial direction away from the socket. Due to this elastic force, the bearing faces of the damping element are firstly pressed against the front face of the connector pin and are secondly pressed against the bottom of the socket, so that the damping element follows all movements of connector pin and socket. However, the elastic force caused by the deformation should not be so strong that the connector pin is pushed out of the socket. There should always be a reliable electric contact between the connector pin and the socket.

Preferably, an axial play between the connector pin and the socket is reduced or eliminated by the damping element. The damping element follows the movements of connector pin and socket and absorbs vibrations and relative movements occurring in the axial direction. Thereby, the axial play that is due to vibrations is reduced or even completely eliminated. This is of particular importance in environments where the plug-in connection is exposed to strong vibrations and shock loads, e.g. in an engine, a motor unit, a vehicle, etc. The advantage is that at the contact areas between the connector pin and the socket, abrasion is reduced, so that a good electrical contact with a low ohmic transition resistance is maintained over longer periods. Thus, by reducing the axial play, the electrical contact between connector pin and socket is improved in the long term.

Preferably, the socket is one of the following: a lamella socket, a socket with wire spring contacts, a slotted sleeve. A lamella socket comprises a plurality of lamellae resiliently bent inwards that are pressed from all sides against the plugged-in connector pin and thus establish an electrical contact between connector pin and socket. In a socket with wire spring contacts, wire spring contacts for establishing a resilient electrical connection to the plugged-in connector pin are attached at the sidewalls. In contrast, a slotted sleeve has one or more slots in the longitudinal direction. Initially, the diameter of the slotted sleeve is smaller than the diameter of the connector pin. When the connector pin is plugged in, the diameter of the slotted sleeve is widened and the slotted sleeve is pressed against the plugged-in connector pin from all sides. For example, a slotted sleeve may comprise a plurality of resilient fingers that contact the inserted connector pin from all sides.

Preferably, the socket comprises stamp-rolled or stamp-bent contacts. Contacts of this kind lie resiliently against the plugged-in connector pin.

Preferably, the damping element is configured to shift a resonance frequency of the entirety of connector pin, damping element and socket in a way that the resonance frequency is located outside a frequency range of external vibrations. Further preferably, the damping element is configured to shift a resonance frequency of the entirety of connector pin, damping element and socket to a frequency range that lies outside of the frequency range of external vibrations relevant for the exposure profile of the plug-in connector. For a certain application, it is known in advance what exposure profile the plug-in connector has to comply with and what frequency spectrum the external vibrations acting on the plug-in connector have. Based on this information, the Shore hardness and the geometry of the damping element can be chosen such that the resonance frequency of the entirety of connector pin, damping element and socket is located outside the frequency range of external vibrations. In the field of motors and drives, the frequencies of normally occurring vibrations typically lie in the range of e.g. 0 Hz to 2000 Hz. Furthermore, shock loads of e.g. up to 30 times the acceleration due to gravity may impact on the plug-in connector. If the properties of the damping element are adjusted such that the resonance frequency of the arrangement of connector pin, damping element and socket lies above this frequency range, then resonances can be prevented. Then, at the vibration frequencies acting from outside, a resonance will not occur, so that the vibrations acting from outside can be dampened in the axial direction.

Preferably, the damping element is attached at the bottom of the socket. By attaching the damping element at the bottom of the socket, the damping element always remains inside the socket, even if the connector pin is pulled out. Thus, it is made sure that there is always a damping element between the connector pin and the socket for dampening the relative movement. The attachment at the bottom of the socket further has the advantage that the damping element is effectively protected by the surrounding sidewalls of the socket.

Preferably, a shaft for attaching the damping element at the bottom of the socket is attached at or integrally moulded with the bearing face of the damping element facing the bottom of the socket, wherein the shaft is configured to be inserted into a corresponding opening at the bottom of the socket for fixing the damping element at the bottom of the socket. Hence, the shaft is provided for fixing the damping element at a defined position at the bottom of the socket. Because of the shaft attached at or integrally moulded with the damping element, a characteristic mushroom-shaped design of the damping element is obtained, wherein the cap serves for absorbing vibrations and wherein the shaft of the mushroom serves for anchoring the damping element at the bottom of the socket.

Alternatively, the damping element is preferably attached at the front face of the connector pin. Also in this variant, after the connector pin has been plugged in, the damping element is located between the front face of the connector pin and the bottom of the socket and can thus dampen an axial relative movement between connector pin and socket. Due to the attachment at the front face of the connector pin, the damping element is easily accessible and can accordingly be checked in an easy way and replaced if required. Hence, a damping element that is abraded or embrittled can e.g. be replaced in a simply way.

Preferably, a shaft for attaching the damping element to the front face of the connector pin is attached at or integrally moulded with the bearing face of the connector pin facing the front face of the connector pin, wherein the shaft is configured to be inserted into a corresponding opening at the front face of the connector pin for fixing the damping element at the front face of the connector pin. Hence, the connection between the damping element and the front face of the connector pin is again established via a shaft attached at or integrally moulded with the damping element that is inserted into a corresponding opening.

Preferably, the plug-in connector comprises a housing with a first housing part and a second housing part, with the connector pin being arranged in the first housing part and with the socket being arranged in the second housing part. By accommodating the plug-in connector in a housing, the mechanical stability is improved. Furthermore, the intrusion of dirt, dust, abrasion etc. is prevented. In this way, it is accomplished that the contact parts of the connector pin and the socket that are in contact with each other are shielded from dirt, dust, abrasion in the environment, so that wear is reduced.

Preferably, when forming the plug-in connection, the first housing part is lockable with the second housing part. Thus, the mechanical stability is further improved. Further preferably, one or more insulating bodies are arranged between the housing and the connector pin or between the housing and the socket. Thus, the energized parts are shielded against the surrounding, which is particularly advantageous at harsh environmental conditions. In this way, creeping currents can be avoided.

Preferably, the housing comprises at least one sealing element configured to prevent an intrusion of abrasion from the region outside of the connector pin and the socket into the region between connector pin and socket. By this measure, a protection against premature abrasion of the contact parts in vibration-loaded environments is achieved.

BRIEF DESCRIPTION OF THE DRAWING

The invention is illustrated in greater detail with the aid of schematic drawings.

It shows schematically:

FIG. 1 shows a section through the plug-in connector with housing.

FIG. 2 shows a plug-in connector with connector pin and socket without housing.

FIG. 3 shows a perspective view of the damping element used in the plug-in connector of FIG. 2.

FIG. 4: FIG. 4 shows a top view of the damping element.

FIG. 5: FIG. 5 shows a section through the damping element along the section line V-V.

FIG. 6: FIG. 6 shows an alternative design of a plug-in connector with connector pin and socket.

DETAILED DESCRIPTION OF EMBODIMENTS OF THE INVENTION

Figure 1:
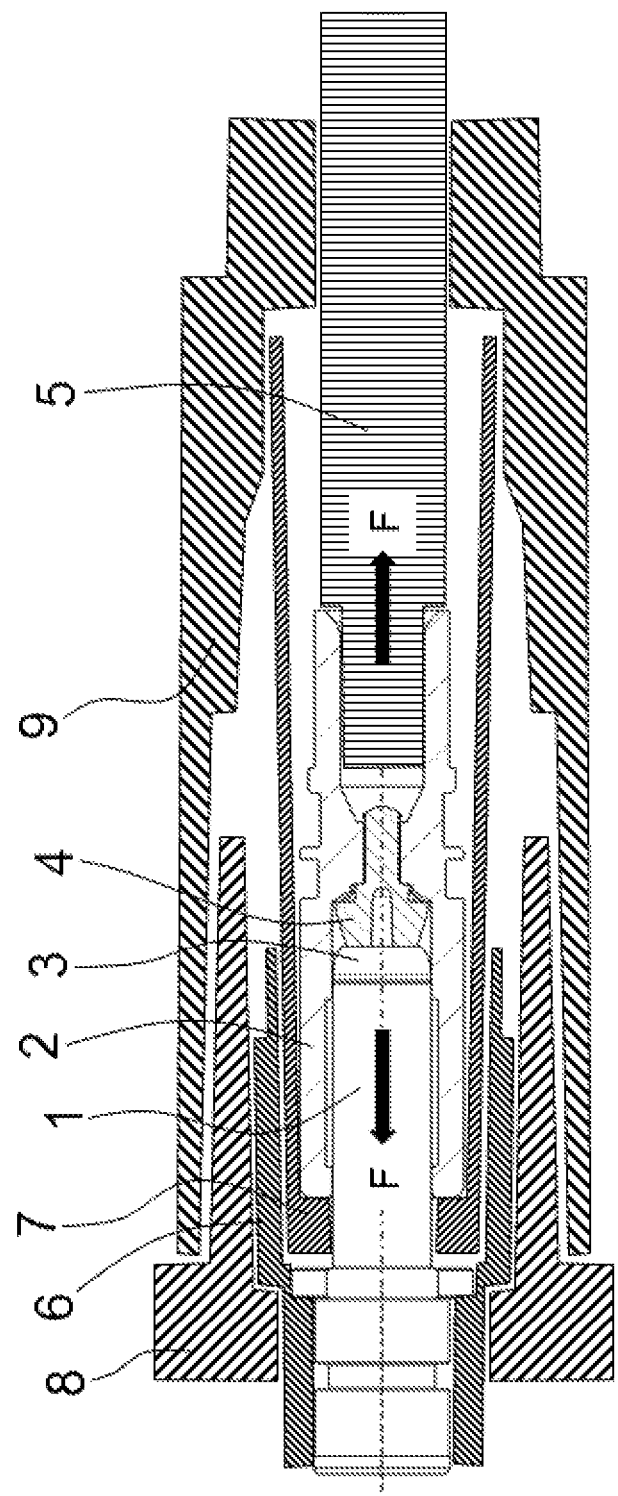
FIG. 1.

In the following description of preferred embodiments of the present invention, identical reference numerals denote identical or comparable components.

FIG. 1 shows a sectional view of a plug-in connector that is particularly suited for use in environments subjected to vibrations. The plug-in connector comprises a plug part and a socket part that is formed complementary to the plug part. The plug part can be inserted into the socket part and pulled out again. The plug part comprises a connector pin 1 of electrically conductive material, preferably metal. As a protection against non-intentional touching, a touch protection 3 is provided at the front face of the connector pin 1. The connector pin 1 is surrounded by a circumferential insulating body 6 that shields the connector pin 1 to the outside. The insulating body 6 together with the connector pin 1 contained therein is accommodated in a plug side housing part 8.

The socket part of the plug-in connector comprises a socket 2 of conductive material, preferably metal, wherein the connector pin 1 is insertable into the socket 2. The inserted connector pin 1 is in direct contact with the side walls of the socket 2, so that a good electrical contact is established between the connector pin 1 and the socket 2. A connecting wire 5 for electrically connecting the socket 2 is connected to the end of the socket 2 that is opposite the connector pin 1.

At the bottom of the socket 2, a damping element 4 is located, the damping element 4 being configured for dampening the relative movements in the axial direction between the connector pin 1 and the socket 2. The damping element 4 comprises a shaft-shaped base that is inserted into a corresponding opening at the bottom of the socket 2, in order to fix the damping element 4 at the bottom of the socket 2. When the connector pin 1 is plugged in, the front face of the connector pin lies flat against the anterior side of the damping element 4. When the connector pin 1 is plugged in, the connector pin 1 already compresses the damping element 4 in a way that the damping element 4 exerts an outward force F in the axial direction upon the connector pin 1.

The socket 2 is arranged in an insulating body 7 circumferentially encompassing the socket that insulates the energized socket 2 to the outside. The insulating body 7 together with the socket 2 contained therein is arranged within a socket side housing part 9. When the plug part is inserted into the socket part, firstly the connector pin 1 is inserted into the socket 2, whereby an electrical connection between the connector pin 1 and the socket 2 is established. Furthermore, the plug side housing part 8 together with the insulating body 6 is pushed into the circumferential gap between the socket side housing part 9 and the insulating body 7.

Thus, the insulating bodies 6 and 7, the plug side housing part 8 and the socket side housing part 9 provide an effective protection of the connector pin 1 and the socket 2 against dirt, dust, oil, abrasion etc. This shielding contributes to minimizing abrasion of the contact parts. Furthermore, the energized contact parts are electrically insulated to the outside, so that no leakage currents or the like can occur.

Figure 2:
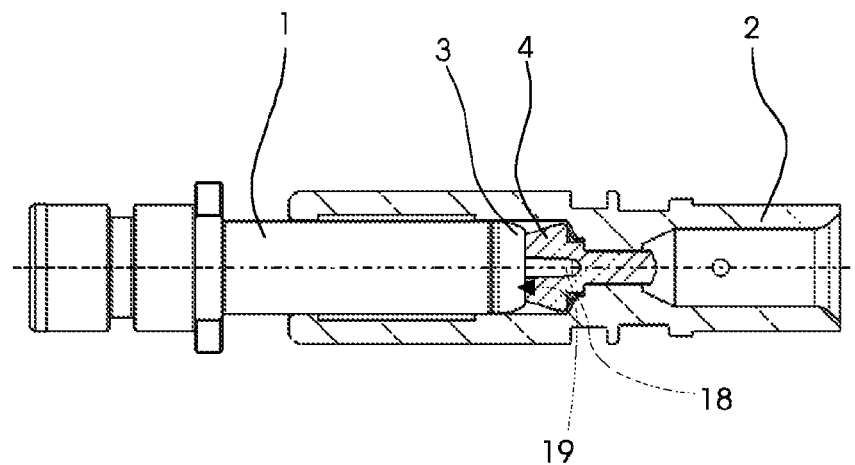
FIG. 2.

In FIG. 2, the energized contact parts of FIG. 1 are drawn again separately. In FIG. 2, the connector pin 1 with the touch protection 3 arranged at the front face is depicted. Furthermore, the socket 2 can be recognised, with the damping element 4 being arranged at its bottom. The connector pin 1 is inserted into the socket 2 as far as possible, so that the front face 19 of the connector pin 1 lies flat against the anterior bearing face of the damping element 4. Preferably, the damping element 4 is pressed together between the connector pin 1 and the bottom of the socket 2. As the damping element 4 preferably has dampening properties as well as elastic properties, the compression of the damping element 4 causes an elastic force that acts on the connector pin 1 in the axial direction. In FIG. 1, the axial force F that arises when the damping element 4 is deformed is depicted. The entirety of connector pin 1, damping element 4 and socket 2 shown in FIG. 2 is designed to effectively dampen vibrations occurring in the axial direction. Because of this dampening effect provided by the damping element 4 in the axial direction, the axial play between connector pin 1 and socket 2 is significantly reduced, so that the abrasion at the contact areas that is due to the relative movement between the connector pin 1 and the socket 2 is reduced. Due to this reduction of oscillation wear, it is also possible in environments subjected to vibrations over long periods to ensure a sufficiently low transition resistance between the connector pin 1 and the socket 2.

Figure 3:
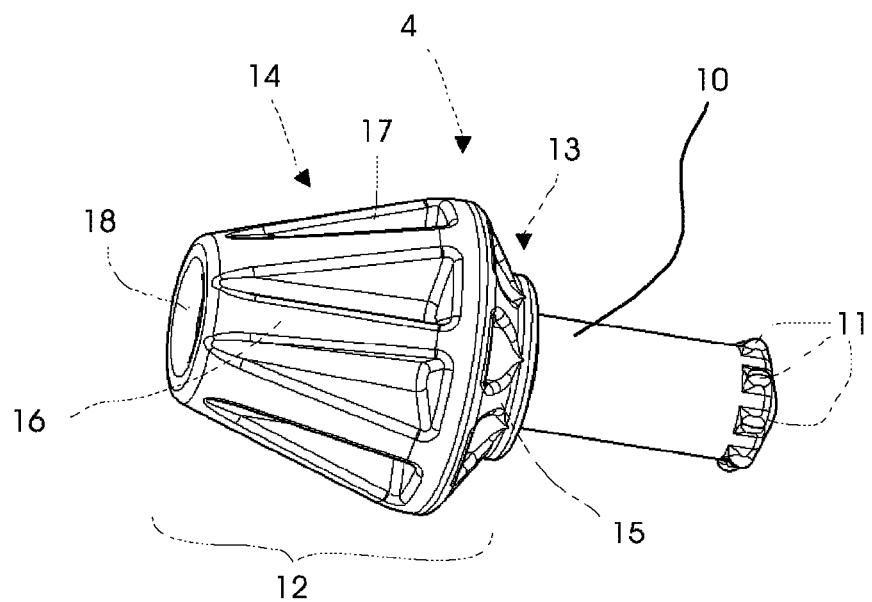
FIG. 3.

FIG. 3 shows a perspective oblique view of the damping element 4. Preferably, the damping element consists of a polymer, further preferably of an elastomer. In particular, the damping element 4 can consist of silicone rubber. If the damping element 4 is made of a material of this kind, it will possess elastic properties as well as dampening properties. Because of the dampening properties, the damping element 4 is capable of dampening vibrations that act on the plug-pin connector in the axial direction. Thus, the amplitude of these vibrations is reduced. The kinetic energy impinging on the damping element 4 is at least in part absorbed by the material of the damping element 4 and converted to heat. Thus, any motion acting on the damping element 4 is dampened.

In general, the damping element also has elastic properties. Because of its elasticity, after a deformation caused by an effective force, the damping element 4 returns to its initial shape again. Because of the elasticity of the damping element 4, the impacting force will be at least partly stored in the deformed material, which may give off this force towards the outside later. By varying the material composition of the polymeric material, the rigidity, the elastic properties and the dampening properties of the damping element 4 can be adjusted within certain ranges. For example, it has turned out to be advantageous to realise the damping element 4 with a Shore hardness in the range from 20 to 60. The possibility for varying the elastic properties and the dampening properties offers the option to adapt the properties of the damping element 4 to the respective requirements of the intended purpose. This implies in particular an adaptation to the known frequency spectrum of occurring vibration. By matching the properties of the damping element 4 with the expected frequency spectrum of vibrations, it can be achieved that the occurring vibrations are optimally dampened in the axial direction.

A further opportunity for tuning the properties of the damping element 4 is a suitable choice of the damping element's geometry. The damping element 4 shown in FIG. 3 comprises a head 12 and a shaft 10, the shaft 10 being integrally moulded with the bearing face facing the bottom of the socket 2. The shaft of the damping element 4 is inserted into a corresponding opening at the bottom of the socket 2. As soon as the shaft 10 is completely inserted into the opening, the damping element 4 is fixed in this position by the expanding snap-in knobs 11. Thus, the bearing face 13 of the damping element 4 lies flat against the bottom of the socket 2 and is fixed in this position by the shaft 10 and the snap-in knobs 11.

The head 12 of the damping element 4 comprises a truncated cone shaped section 14. The front face 19 of the connector pin 1 lies flat against the anterior bearing face of this truncated cone shaped section 14 so that the head 12 of the damping element 4 is pressed together between the front face 19 of the connector pin 1 and the bottom of the socket 2. A core hole 18 extends in the axial direction into the head 12 of the damping element 4. The thickness of the surrounding walls is given by the choice of the diameter of core hole 18. Via the diameter of the core hole 18, it can be specified how easily deformable or hardly deformable the damping element 4 shall be. Furthermore, the damping element comprises a plurality of fins 15, 16 both in the truncated cone shaped section 14 and in the region of the bearing face 13. Said plurality of fins 15, 16 extends radially from the inside outwards, with the fins 15, 16 being separated from each other by interspaces 17, respectively. By the number and thickness of the fins 15, 16, the elastic properties and the damping properties of the damping element can be influenced as well. The larger the number of fins 15, 16 is and the thicker the fins 15, 16 are formed, the harder it will be to deform the damping element 4 in the region of the head 12.

In FIG. 4, a top view of the damping element 4 is shown. In this top view, the core hole 18 can be seen. Furthermore, the fins 16 extending radially outwards and the interspaces 17 located therebetween can be seen. In addition, in FIG. 4, the section along the line V-V is marked.

The corresponding sectional view is shown in FIG. 5. FIG. 5 shows the sliced damping element 4 with the head 12 and the shaft 10. In the region of the head 12, the fins 15, 16 and the interspaces 17 can be seen. Furthermore, the core hole 18 is depicted which extends in the axial direction into the head 12. In addition, the snap-in knobs 11 integrally formed at the end of the shaft 10 can be seen.

In FIG. 6, an alternative design of a plug-in connector is shown, which also comprises a connector pin 101, a socket 102 and a damping element 104 arranged between the front face of the connector pin 101 and the bottom of the socket 102. The damping element 104 shown in FIG. 6 also fulfils the function of providing a dampening effect between the connector pin 101 and the socket 102 that dampens vibrations in the axial direction and thus reduces the axial play between the connector pin 101 and the socket 102. In this way, oscillation wear at the contact surfaces is effectively counteracted. In contrast to the designs discussed so far, the damping element 104 is not fixed at the bottom of the socket 102, but is instead mounted to the front face of the connector pin 101. For this purpose, the damping element 104 comprises a shaft 105 integrally moulded with the bearing face facing the connector pin 101, which is adapted for being inserted into a corresponding opening 106 at the front face of the connector pin 101. In this way, the damping element 104 is firmly connected with the front face of the connector pin 101. When the connector pin 101 is unplugged from the socket 102, the damping element 104 remains attached at the front end of the connector pin 101 and is therefore pulled out from the socket 102 together with the connector pin 101. Thus, the damping element 104 provides a touch protection, in order to prevent that a person inadvertently touches the front face of the connector pin 101. A further advantage of the damping element 104 attached at the front end of the connector pin 101 is that it can be easily checked and can be exchanged when required, for example in case of material embrittlement, when it is no longer suited for effectively dampening vibrations in the axial direction.

The features described in the above description, claims and figures can be relevant to the invention in any combination. Their reference numerals in the claims have merely been introduced to facilitate reading of the claims. They are by no means meant to be limiting.

The invention claimed is:

1. A damping element for a plug-in connector, the plug-in connector comprising a socket and a connector pin pluggable into the socket, wherein
the damping element is configured to be disposed inside of the socket and comprises a first bearing face adapted for lying flat against the bottom of the socket and a second bearing face adapted for lying flat against the front face of the connector pin,
either a first shaft is attached at or integrally moulded with the first bearing face or a second shaft is attached at or integrally moulded with the second bearing face,
the damping element is adapted for providing a damping effective in the axial direction between the connector pin and the socket, and
the damping element is an electrically insulating element, the damping element consisting of electrically insulating material,
the damping element further comprising at least one of the following:
the damping element comprises a plurality of fins extending radially outward, and deformation force and dampening properties of the damping element are adjustable by suitable choice of number and design of the fins, and
the damping element comprises a core hole extending in the axial direction, wherein the deformation force and the dampening properties of the damping element are influenceable via the diameter of the core hole and the resulting wall thickness of the damping element.

2. The damping element according to claim 1, wherein the damping element consists of a polymer or an elastomer or a silicone rubber.

3. The damping element according to claim 1, wherein the material of the damping element possesses dampening properties as well as elastic properties.

4. A plug-in connector comprising:
a socket for accepting a connector pin,
a connector pin configured for being plugged into the socket and being unplugged from the socket again, and
a damping element attached at a bottom of the socket, wherein a shaft for attaching the damping element at the bottom of the socket is attached at or integrally moulded with a bearing face of the damping element facing the bottom of the socket, and the shaft is configured to be inserted into a corresponding opening at the bottom of the socket, the damping element being arranged such that if the connector pin is plugged in, the damping element is disposed inside the socket between a front face of the connector pin and the bottom of the socket,
wherein the damping element is configured to provide a damping effective in the axial direction between the connector pin and the socket,
wherein the damping element is made of electrically insulating material, and
wherein the plug-in connector is configured to establish an electric connection between the connector pin and the socket via sidewalls of the socket.

5. The plug-in connector according to claim 4, wherein the damping element is configured such that if the connector pin is plugged in, the damping element is pressed together inside the socket between the front face of the connector pin and the bottom of the socket.

6. The plug-in connector according to claim 4, wherein the material of the damping element possesses dampening properties as well as elastic properties.

7. The plug-in connector according to claim 4, wherein the damping element is configured such that if the connector pin is plugged in, the damping element exerts an elastic force on the connector pin in an axial direction away from the socket.

8. The plug-in connector according to claim 4, wherein the damping element is configured to shift a resonance frequency of the entirety of connector pin, damping element and socket in a way that the resonance frequency is located outside a frequency range of external vibrations.

9. The plug-in connector according to claim 4, wherein the plug-in connector comprises a housing with a first housing part and a second housing part, with the connector pin being arranged in the first housing part and with the socket being arranged in the second housing part.

10. A method for forming a plug-in connection between a socket for accepting a connector pin and a connector pin that is configured to be plugged into the socket and unplugged from the socket again, wherein a damping element is attached at a bottom of the socket, wherein a shaft for attaching the damping element at the bottom of the socket is attached at or integrally moulded with a bearing face of the damping element facing the bottom of the socket, and the shaft is configured to be inserted into a corresponding opening at the bottom of the socket, the method comprising:
inserting the connector pin into the socket; and
pressing together the damping element by the connector pin, the damping element being disposed between a front face of the connector pin and the bottom of the socket, the damping element being made of electrically insulating material;
wherein the compressed damping element provides a damping effective in an axial direction between the connector pin and the socket; and wherein an electric connection is established between the connector pin and the socket via sidewalls of the socket.

11. A plug-in connector comprising:
a socket for accepting a connector pin,
a connector pin configured for being plugged into the socket and being unplugged from the socket again, and
a damping element attached at a front face of the connector pin, wherein a shaft for attaching the damping element to the front face of the connector pin is attached at or integrally moulded with a bearing face of the damping element facing the front face of the connector pin, and the shaft is configured to be inserted into a corresponding opening at the front face of the connector pin, the damping element being arranged such that if the connector pin is plugged in, the damping element is disposed inside the socket between the front face of the connector pin and a bottom of the socket,
wherein the damping element is configured to provide a damping effective in the axial direction between the connector pin and the socket,
wherein the damping element is configured to shift a resonance frequency of the entirety of connector pin, damping element and socket in a way that the resonance frequency is located outside a frequency range of external vibrations,
wherein the damping element is made of electrically insulating material, and
wherein the plug-in connector is configured to establish an electric connection between the connector pin and the socket via sidewalls of the socket.

12. The plug-in connector according to claim 11, wherein the damping element is configured such that if the connector pin is plugged in, the damping element is pressed together inside the socket between the front face of the connector pin and the bottom of the socket.

13. The plug-in connector according to claim 11, wherein the material of the damping element possesses dampening properties as well as elastic properties.

14. The plug-in connector according to claim 11, wherein the damping element is configured such that if the connector pin is plugged in, the damping element exerts an elastic force on the connector pin in an axial direction away from the socket.

15. The plug-in connector according to claim 11, wherein the plug-in connector comprises a housing with a first housing part and a second housing part, with the connector pin being arranged in the first housing part and with the socket being arranged in the second housing part.

16. A method for forming a plug-in connection between a socket for accepting a connector pin and a connector pin that is configured to be plugged into the socket and unplugged from the socket again, wherein a damping element is attached at a front face of the connector pin, wherein a shaft for attaching the damping element to the front face of the connector pin is attached at or integrally moulded with a bearing face of the damping element facing the front face of the connector pin, and the shaft is configured to be inserted into a corresponding opening at the front face of the connector pin, the method comprising:
inserting the connector pin into the socket; and
pressing together the damping element by the connector pin, the damping element being disposed between the front face of the connector pin and a bottom of the socket, the damping element being made of electrically insulating material;
wherein the compressed damping element provides a damping effective in an axial direction between the connector pin and the socket; wherein the damping element is configured to shift a resonance frequency of the entirety of connector pin, damping element and socket in a way that the resonance frequency is located outside a frequency range of external vibrations; and
wherein an electric connection is established between the connector pin and the socket via sidewalls of the socket.

17. A plug-in connector comprising:
a socket for accepting a connector pin,
a connector pin configured for being plugged into the socket and being unplugged from the socket again, and
a damping element attached at a front face of the connector pin, wherein a shaft for attaching the damping element to the front face of the connector pin is attached at or integrally moulded with a bearing face of the damping element facing the front face of the connector pin, and the shaft is configured to be inserted into a corresponding opening at the front face of the connector pin, the damping element being arranged such that if the connector pin is plugged in, the damping element is disposed inside the socket between the front face of the connector pin and a bottom of the socket,
wherein the damping element is configured to provide a damping effective in the axial direction between the connector pin and the socket,
wherein the damping element is made of electrically insulating material, and
wherein the plug-in connector is configured to establish an electric connection between the connector pin and the socket via sidewalls of the socket,
the damping element further comprising at least one of the following:
the damping element comprises a plurality of fins extending radially outward, and deformation force and dampening properties of the damping element are adjustable by suitable choice of number and design of the fins, and
the damping element comprises a core hole extending in the axial direction, wherein the deformation force and the dampening properties of the damping element are influenceable via the diameter of the core hole and the resulting wall thickness of the damping element.

* * * * *